(12) United States Patent
Quinn

(10) Patent No.: US 9,631,093 B2
(45) Date of Patent: Apr. 25, 2017

(54) METHODS FOR REDUCING ODORS IN ASPHALT

(71) Applicant: Owens Corning Intellectual Capital, LLC, Toledo, OH (US)

(72) Inventor: Robert Edwin Quinn, New Albany, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 297 days.

(21) Appl. No.: 13/706,980

(22) Filed: Dec. 6, 2012

(65) Prior Publication Data

US 2013/0145960 A1 Jun. 13, 2013

Related U.S. Application Data

(60) Provisional application No. 61/567,673, filed on Dec. 7, 2011.

(51) Int. Cl.
```
C08K 5/098    (2006.01)
C08K 5/1545   (2006.01)
C08K 3/10     (2006.01)
C08L 95/00    (2006.01)
```

(52) U.S. Cl.
CPC ............... *C08L 95/00* (2013.01); *C08K 3/10* (2013.01); *C08K 5/098* (2013.01); *C08K 5/1545* (2013.01); *C08L 2555/60* (2013.01); *C08L 2555/82* (2013.01)

(58) Field of Classification Search
CPC .................................... C10C 1/00; C08L 95/00
USPC ................... 106/246, 622; 523/102
See application file for complete search history.

(56) References Cited

U.S. PATENT DOCUMENTS

| | | | | |
|---|---|---|---|---|
| 2,115,823 | A | * | 5/1938 | Winning ............... C10M 1/08 246/34 D |
| 2,391,749 | A | * | 12/1945 | Snyder ............................. 106/18 |
| 3,156,542 | A | | 11/1964 | Younghouse |
| 3,366,500 | A | * | 1/1968 | Kracauer ................. C08K 5/06 106/269 |
| 3,615,801 | A | | 10/1971 | Marklow et al. |
| 3,911,193 | A | | 10/1975 | Resz et al. |
| 3,987,602 | A | | 10/1976 | Stahl |
| 4,069,064 | A | | 1/1978 | Nett et al. |
| 4,147,212 | A | | 4/1979 | Tisdale |
| 4,449,987 | A | | 5/1984 | Lindauer |
| 4,465,493 | A | | 8/1984 | Attar |
| 5,064,546 | A | * | 11/1991 | Dasai ............... C10M 169/045 208/18 |
| 5,271,767 | A | | 12/1993 | Light, Sr. et al. |
| 5,362,316 | A | | 11/1994 | Paradise |
| 5,437,693 | A | * | 8/1995 | Iizuka et al. .................. 44/302 |
| 5,840,809 | A | | 11/1998 | Ohtsuka et al. |
| 5,989,662 | A | | 11/1999 | Janicki et al. |
| 6,069,194 | A | | 5/2000 | Franzen |
| 6,107,373 | A | | 8/2000 | Janicki et al. |
| 6,156,833 | A | | 12/2000 | Rauls |
| 6,313,367 | B1 | | 11/2001 | Breen |
| 6,461,421 | B1 | | 10/2002 | Ronvak |
| 6,488,988 | B2 | | 12/2002 | Trumbore et al. |
| 6,749,677 | B2 | | 6/2004 | Freisthier |
| 6,764,542 | B1 | | 7/2004 | Lackey et al. |
| 6,987,207 | B1 | | 1/2006 | Ronyak |
| 7,037,955 | B2 | | 5/2006 | Timcik et al. |
| 7,157,411 | B2 | | 1/2007 | Rohde et al. |
| 7,252,755 | B2 | | 8/2007 | Kiser et al. |
| 2005/0223668 | A1 | | 10/2005 | Thompson et al. |
| 2006/0155003 | A1 | | 7/2006 | Timcik et al. |
| 2008/0146477 | A1 | | 6/2008 | Mentink et al. |
| 2009/0012214 | A1 | | 1/2009 | Butler et al. |
| 2009/0145330 | A1 | | 6/2009 | Draper et al. |
| 2009/0314184 | A1 | * | 12/2009 | Quinn ................... C08K 5/07 106/281.1 |

FOREIGN PATENT DOCUMENTS

GB 1413323 11/1975
JP 2007-137922 6/2007

OTHER PUBLICATIONS

"Castor Oil". Santa Cruz Biotechnology. Retrieved from http://www.scbt.com/datasheet-214671-castor-oil.html.*
"D-Glucose". PubChem. Retrieved from http://pubchem.ncbi.nlm.nih.gov/compound/D-glucose.*
"Zinc Laurate". PubChem. Retrieved from http://pubchem.ncbi.nlm.nih.gov/compound/17144#section=Top.*
Office action from U.S. Appl. No. 12/343,664 dated Aug. 30, 2011.
Office action from U.S. Appl. No. 12/343,664 dated Mar. 6, 2012.
Notice of Allowance from U.S. Appl. No. 12/343,664 dated Jul. 9, 2012.
Notice of Allowance from U.S. Appl. No. 12/343,664 dated Jan. 7, 2013.
"A Brief Introduction to Asphalt and some of its uses", Manual Series No. 5 (MS-5), The Asphalt Institute, 7th Ed. Sep. 1974, 8 pgs.
Hartman et al., "Composition of Vanilla Beans from Different Geographical Regions", CAFT, Rutgers University 2003.
Kirk-Othmer, Encyclopedia of Chemical Technology, vol. 3, Third 3d. (1978), pp. 284-327, John Wiley & Sons, NY, 46 pg.s.
Lange et al., "Commercial Odor-Reducing Agents for Minimizing the Odor Potential of Asphalt Binders", J. of Environmental Engineering, Apr. 2006.

* cited by examiner

*Primary Examiner* — Jun Li
*Assistant Examiner* — Karam Hijji
(74) *Attorney, Agent, or Firm* — Calfee, Halter & Griswold LLP

(57) ABSTRACT

Compositions and methods for reducing the foul odors of a hydrocarbonaceous material such as asphalt comprise the addition of an odor reducing amount of a reducing carbohydrate and/or a soluble zinc compound. The reducing carbohydrate may be a monosaccharide, oligosaccharide or polysaccharide, including a starch; and it may be used as a sole odor reducing agent or in combination with soluble zinc compounds and/or other odor reducing compounds.

20 Claims, No Drawings

METHODS FOR REDUCING ODORS IN ASPHALT

This application is related to but does not claim priority from prior filed U.S. patent application Ser. No. 12/343,664 filed 24 Dec. 2008 and published on 24 Dec. 2009 as US 2009/0314184.

BACKGROUND

The present invention relates generally to hydrocarbonaceous compositions, such as asphalts and bitumens. More particularly the present invention generally relates to compositions for reducing the foul, undesirable or unpleasant odors emitted from such hydrocarbonaceous compositions.

Two primary uses of asphalt include road paving and roofing coatings. Asphalt-based roofing materials, such as roofing shingles, roll roofing, and built-up roofing, are installed on the roofs of buildings and residential dwellings to provide protection from the elements. When asphalt is used in roofing applications, the asphalt is first heated in a vessel, such as a gas-fired roofing kettle. As the temperature of the asphalt rises, volatile materials, such as hydrocarbons, sulfides, and mercaptans, are emitted that can have strong, unpleasant, foul odors. The odors emitted are not only unpleasant to smell, but they may also be an irritant to workers and/or other individuals in the vicinity of the vessel or to those who come within close range of the hot asphalt. For instance, the odorous fumes from the asphalt may cause headaches and/or irritation to the eyes and mucus membranes of the nose and throat, which can result in a deterioration of worker productivity and/or in increase in the number of sick days taken by workers.

Although the properties of asphalts used in paving generally differ from those used in roofing coatings, the problem of heating and release of volatile and malodorous compounds is common to both roofing and paving asphalts.

Many attempts to reduce undesirable odors emitted from odor-causing compounds are known in the art. Non-limiting examples of some of these approaches and odor-masking additives are set forth below.

In a first approach, exemplified by U.S. Pat. No. 6,488,988 to Trumbore, et al. and U.S. Pat. Nos. 5,989,662 and 6,107,373 to Janicki, et al. a physical barrier is formed on the surface of the asphalt to reduce fuming. Trumbore teaches that a substantially insoluble blanket material is added to the liquid asphalt to form a skin on the surface of the asphalt and reduce the fuming. Examples of blanket materials include polyurethane, polyethylene terephthalate, ground soda bottles, starch, and cellulosic materials. Janicki, et al. disclose methods of reducing fumes produced from a kettle of molten asphalt that includes adding about 0.25 to about 6.0% by weight of a polymer (e.g., polypropylene) to the asphalt. The polymer material preferably forms a skin across substantially the entire upper surface of the asphalt. Janicki teaches that at least a 25% reduction of the visual opacity of the fumes, at least a 20% reduction of the hydrocarbon emissions of the fumes, and at least a 15% reduction of suspended particulate emissions of the fumes is obtained.

In other approaches, essential oils are added as odor-masking compounds. For example, U.S. Pat. No. 5,271,767 to Light, Sr., et al. discloses a composition that consists essentially of (1) liquid asphalt, hot-mix asphalt, hot-mix, or cold lay asphalt with added latex and (2) an additive that contains a citrus terpene (4-isopropyl 1-methylcyclohexene) D-limonene mixed with a vegetable oil such as cottonseed oil, soya oil, rapeseed (canola) oil, peanut oil, etc. and a silicone oil dispersant. It is taught that when 0.5-1.0 parts of the composition are mixed with 99.0-99.5 parts liquid asphalt, the resulting liquid asphalt composition is substantially free of objectionable odors. Also, U.S. Pat. No. 7,037,955 to Timcik and U.S. Patent Publication No. 2006/0155003 to Timcik, et al. disclose methods for reducing odor in an oil based medium such as asphalt by adding an essential oil to the oil-based medium in an odor reducing amount. The essential oil may be one or more essential oils or essential oil components, and includes natural extracts of various products of aromatic plants and trees. Essential oils for use in the invention include ajowan, angelica root, angelica seed, aniseed china star, carrot seed, and fir needle, among many others. Examples of essential oil components include terpenes, alcohols, aldehydes, aromatics, phenolics, esters, terpene derivatives, non-terpene essential oil components, and terpene derivatives.

In yet another approach, U.S. Pat. Nos. 6,461,421 and 6,987,207 to Ronyak discloses compositions that include an odor-suppressing amount of an aldehyde or a ketone along with a carboxylic acid ester; and, in the latter case, also including a soy methyl ester. It is asserted that the composition significantly reduces the odor given off by a hydrocarbonaceous material such as asphalt.

Further, U.S. Patent Publication No. 2009/0314184 to Quinn, et al. discloses the use of certain aldehyde-containing compositions, with or without ketones but without esters, for reducing the malodors of asphalts. The disclosed aldehydes include 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin, and cinnamaldehyde. In exemplary embodiments the composition consists solely of vanillin.

US patent Publication No. 2008/0146477 to Mentink, et al. discloses certain compositions and methods for treating asphalts and bitumens, the compositions containing certain specific esters of glutaric, succinic and adipic acids, or ethers or esters of a product derived from the internal dehydration of a sugar. The purpose of Mentinck's compositions appears to be a renewable source of additives to replace the current use of vegetable, mineral or fossil oils in the making of adjuvants for fluxes and binders for asphalts. The criteria set forth for these adjuvants do not mention odor-reduction.

US Patent publication 2009-0145330 to Draper, et al, discloses the use of certain inorganic zinc compounds like zinc oxide, zinc sulfonate or zinc carbonate, typically in nanoparticle formats, for reducing the evolution of hydrogen sulfide from asphalts.

U.S. Pat. No. 4,147,212 to Tisdale discloses the use of water soluble zinc ammonium carbonate salts for reduction of sulfides in drilling and working with oil and gas. US Patent Publication 2009/0012214 to Butler, et al. describes the use of heavy metal, water insoluble soaps (e.g. zinc stearate) to alter the viscosity and/or rheological properties of asphalts.

Thus there remains a need in the art for odor reduction using effective though low-cost compositions capable of reducing odors in hydrocarbonaceous materials such as asphalt.

SUMMARY

In one aspect, the invention relates to a hydrocarbonaceous material having reduced foul odors. The hydrocarbonaceous material includes one or more asphalts and an odor mitigating concentrate containing an odor mitigating compound in an odor mitigating amount. The foul odors may be reduced relative to the asphalt in the absence of the odor mitigating concentrate. The odor mitigating compound may be selected from at least one reducing carbohydrate, at least one soluble zinc compound, and a combination of both a reducing carbohydrate and a soluble zinc compound.

In another aspect, the present invention relates to methods for reducing foul odors in hydrocarbonaceous materials like asphalts. In a first variation of the method, the undesirable odors of a hydrocarbonaceous material may be reduced by adding to the hydrocarbonaceous material a concentrate containing an odor mitigating amount of at least one reducing carbohydrate. In a second variation of the method, the undesirable odors of a hydrocarbonaceous material may be reduced by adding to the hydrocarbonaceous material a concentrate containing an odor mitigating amount of at least one soluble zinc compound. In a third variation, at least one reducing carbohydrate and at least one soluble zinc compound are both used to mitigate odors. Additionally, other known odor reducing compounds may be present.

In some exemplary embodiments, the odor mitigating reducing carbohydrate may be mono- oligo- or poly-saccharide. The soluble zinc compounds may include salts of C8-C20 fatty acids; for example salts of C12-C18 fatty acids.

One exemplary feature of the present invention is the reduction of volatile offensive gasses given off by asphalts, especially including hydrogen sulfides and mercaptans (thiols).

Other advantages and features are evident from the following detailed description.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

Unless otherwise indicated, all numbers expressing ranges of magnitudes, such as quantities of ingredients, properties such as molecular weight, reaction conditions, dimensions and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements. All numerical ranges are understood to include all possible incremental sub-ranges within the outer boundaries of the range. Thus, a range of 30 to 90 degrees discloses, for example, 35 to 50 degrees, 45 to 85 degrees, and 40 to 80 degrees, etc.

Hydrocarbonaceous Materials and Bad Odors

The odor-emitting hydrocarbonaceous material may be any hydrocarbonaceous material that emits at ambient temperatures or elevated temperatures undesirable or objectionable odors. These hydrocarbonaceous materials may be based on one or more natural oils, synthetic oils, or a combination thereof.

The mineral oils such as liquid petroleum oils and solvent treated or acid-treated mineral oils of the paraffinic, naphthenic or mixed paraffinic-naphthenic types often contain sulfur compounds. Oils derived from coal or shale are also included. Synthetic oils may include hydrocarbon oils such as, for example, polymerized olefins, alkylbenzenes, polyphenyls, alkylated diphenyl ethers, alkylated diphenyl sulfides, alkylene oxide polymers, esters of dicarboxylic acids, silicon-based oils, and the like.

Unrefined, refined and re-refined oils, either natural or synthetic (as well as mixtures of two or more of any of these) of the type disclosed herein may be included. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Re-refined oils may be obtained by processes similar to those used to obtain refined oils applied to refined oils which have been already used in service. Such re-refined oils are also known as recycled, reclaimed or reprocessed oils and often are additionally processed by techniques directed to the removal of spent additives and oil breakdown products.

The terms "asphalt" and "bitumen" are often used interchangeably, and refer to any of a variety of hydrocarbonaceous pitch materials that are solid or semi-solid brown or black masses at room temperature that gradually liquefy when heated. They occur naturally in some regions of the world, and can be obtained as the residue of fractional distillation of petroleum. Asphalt is further described by Kirk-Othmer, Encyclopedia of Chemical Technology, Vol. 3, Third Ed. (1978) pp. 284-327, John Wiley & Sons, New York. An additional discussion appears in the publication entitled "A Brief Introduction to Asphalt and some of its Uses", Manual Series No. 5 (MS-5), The Asphalt Institute, 7th Ed., September, 1974. Both of these references are incorporated herein by reference.

In accordance with some exemplary embodiments, the asphalts may include natural asphalts and petroleum-refined asphalts which are generally known for roofing and paving applications. The natural asphalts may include, for example, asphaltite such as gilsonite, grahamite and glance pitch; lake asphalt such as trinidad asphalt; and rock asphalt. The petroleum-refined asphalts may include (i) "straight" asphalt obtained by distillation of a crude oil (unblown and substantially unoxidized), (ii) "blown" or "oxidized" asphalt produced by blowing an oxygen-containing gas into a straight asphalt in the presence or absence of a catalyst, (iii) solvent-extracted asphalt obtained when asphaltic material is separated from the petroleum fraction containing it by the use of propane or other solvents, and (iv) cut-back asphalt which is a mixture of straight asphalt and a light petroleum solvent. In some exemplary embodiments, the asphalts include petroleum tar and asphalt cement. The petroleum tars include oil gas tar obtained as a by-product when gases are produced from petroleum fractions, such tar in refined form, cut-back tar obtained by mixing a light petroleum fraction with such tar, and tar-pitch obtained as a residue by removing the volatile fraction from such tar. Any of these kinds of asphalt may be used singly or jointly. Straight asphalt is useful for paving applications, and oxidized and blown asphalts are useful for roofing applications.

Such hydrocarbonaceous materials may contain one or more volatile (at ambient or elevated temperatures) organic compounds (VOCs) such as aliphatic or aromatic hydrocarbons (e.g., methane, ethane, propane, one or more butanes, pentanes, hexanes, benzene, and the like). In the case of asphalts specifically, these and other VOC hydrocarbons, sulfides, and mercaptans may each contribute to the bad odor attributed to asphalt. The terms "foul", "bad", "malodorous", "unpleasant", and "undesirable" are all used interchangeably to characterize the objectionable odor associated with asphalt. Such odors may be caused by many of the above-mentioned compounds, but mercaptans (R—SH) and hydrogen sulfide ($H_2S$), even in small concentrations, contribute significantly to the bad odor; the odor of "rotten eggs" is sometimes used to describe the foul smell.

The presence of these volatile compounds can be determined using known analytical techniques such as sensory electrodes and gas chromatography. The Honeywell Lumidor Micromax Plus is one sensory electrode instrument. It measures certain malodorous headspace gases such as $H_2S$, as well as some odorless gasses and others. One measurement, LEL, measures the Lower Explosive Limit of combustible gases, such as methane, ethane, propane, butane, and others. Some of these are thought to contribute to the foul odors of heated asphalt as well. Other specific undesirable VOCs are disclosed in Tables 1-24 of U.S. Patent Publication No. 2009/0314184 to Quinn, et al., already incorporated herein in its entirety, and include, for example, hydrogen sulfide, butane thiol, thiopene, 2-methyl thiopene, ethyl thiopene, pentane thiol, hexane thiol, dimethyl disulfide, dibenzothiophene, butyl dibenzothiophene, benzene thiol, methylbenzenethiol, o-cresol, p-cresol, phenol, dibenzofuran, quinoline, and decene.

In accordance with the present invention, an "odor mitigating amount" of an odor mitigating composition is that quantity of the odor mitigating composition that reduces at least some of the offensive volatile constituents of the foul odors emitted from asphalt or other hydrocarbonaceous materials. A useful measure of reduction is the fraction of VOCs remaining after treatment, compared to an equivalent untreated control sample. Another measure is the related "percent reduction" from the baseline untreated sample. Either of these measures may be applied to specific individual VOCs or as an average reduction over multiple VOCs, as shown in U.S. Patent Publication No. 2009/0314184. Thus, in some exemplary embodiments, an "odor mitigating amount" shows an average reduction of at least 10%, at least 20%, at least 25%, at least 30%, at least 40%, at least 50% or at least 60%. In some exemplary embodiments, the average reduction may be from about 20 to 95%, from about 30 to 90% or from about 40 to 80%.

In accordance with various exemplary embodiments, odor mitigating compounds added to the hydrocarbonaceous material in an odor mitigating amount to reduce the unpleasant or objectionable odors. In some exemplary embodiments, the odor mitigating compounds may be added in small increments up to 5% (weight/volume or "w/v") of the hydrocarbonaceous material; e.g. from about 0.001% to about 5.0% w/v, or from 0.05% to about 1.0% w/v. In some exemplary embodiments, odor mitigating compounds are added in small increments up to 1% w/v.

While the concentrations above are given for the ultimate dilution of the odor mitigating compounds in the hydrocarbonaceous material, it is often preferable to prepare concentrated dispersions (or "concentrates") of odor mitigating compounds in a carrier vehicle, and to add the liquid concentrates to the hydrocarbonaceous material. Inventive odor mitigating concentrates employing a carrier vehicle may comprise about 1-50% by volume of odor mitigating compounds and about 50-99% by volume of carrier. Dilution with a carrier vehicle may be particularly useful where only a very small amount of compound is required to reduce odor, thereby facilitating handling of the additive. It is also easier to measure and add concentrated liquids to asphalt, than solids or powders. Dilution with a carrier may also help dissolve the compound in the hydrocarbonaceous material. In such cases, an inventive concentrate contains one or more odor mitigating compounds dispersed in a relatively concentrated dispersion in a carrier vehicle.

In some exemplary embodiments, the carrier vehicle is a liquid that is relatively unreactive with the odor mitigating compounds. It should not contribute malodorous compounds itself, but may even contribute to odor mitigation. The odor mitigating compounds may soluble or dispersible in the vehicle, and the vehicle may be miscible with the hydrocarbonaceous material. In some exemplary embodiments, the carrier vehicles include certain oils and certain polyethers. The carrier oils may include, for example, mineral oil, vegetable oil, fatty acid alkyl esters, or mixtures thereof. Exemplary carriers include fatty acid alkyl esters or mixtures of fatty acid alkyl esters. The fatty component of the fatty acid ester may be linear or branched C8-C20 alkyl. Exemplary carriers may include fatty acid methyl ester(s) and fatty acid ethyl esters; and also methyl and ethyl esters of palm, coconut, canola, peanut, sunflower, and safflower oils. Suitable polyethers may include polyethylene glycols (PEG). In some exemplary embodiments, the PEG contains substituents that are nonionic and contain phenyl groups and/or hydrocarbon chains. Specific examples include octylphenol ethoxylates and nonylphenol ethoxylates sold under tradenames TRITON X™ and TERGITOL™ (available from Dow Chemical, Midland, Mich.). Tergitol NP-4 is one suitable carrier.

Reducing Carbohydrates

The invention generally relates to the use of reducing carbohydrates as odor mitigating compounds to reduce or mitigate bad odors emitted from hydrocarbonaceous materials. In accordance with the present invention, "reducing carbohydrate" or "reducing sugar" means any carbohydrate/sugar that either has an aldehyde functional group or is capable of forming one in solution through isomerisation. In some exemplary embodiments, this functional group allows the carbohydrate/sugar to act as a reducing agent to reduce certain chemicals. For example, in Benedict's reagent and Fehling's solution, both of which are used to test for the presence of a reducing sugar, the reducing sugar reduces copper(II) ions to copper(I), which then forms a brick red copper(I) oxide precipitate.

Many sugars with ketone groups in their open chain form are capable of isomerizing via a series of tautomeric shifts to produce an aldehyde group. Such isomermization may result from dissolution and/or thermal decomposition. Therefore, ketone-bearing sugars like fructose may be considered reducing sugars. However, in some exemplary embodiments, it is the isomer containing an aldehyde group which is, since ketones cannot be oxidized without decomposition of the sugar. This type of isomerization may catalyzed by the base present in solutions which test for the presence of aldehydes. Monosaccharides which contain an aldehyde group are known as aldoses, and those with a ketone group are known as ketoses.

Simple monosaccharides exist in solution in ring form as a hemiacetal or hemiketal which gives rise to an additional chiral carbon, and to alpha and beta forms of each sugar. This additional asymmetric carbon is the carbonyl carbon, and is also called the "anomeric" carbon since two "anomers" (i.e. alpha and beta forms) are formed depending on which side of the flat carbonyl bond is attacked by the hydroxyl nucleophile. However, these closed rings may produce reducing sugars when the hemiacetal or hemiketal form isomerizes to the open or straight chain form, which contains the aldehyde or ketone functional group, respectively. Heat is a condition known to promote this isomerization.

However, the present invention is not limited to monosaccharides. Disaccharides, oligosaccharides, polysaccharides, maltodextrins, dextrins and even starches may all have reducing capability and are within the definition of reducing carbohydrate/sugar if they have, or can isomerize to have, an aldehyde group. While simple glucose has been found to be adequate, there may be advantages to longer polymers of reducing sugars, by virtue of the additional molecular weight. In some exemplary embodiments, glucose polymers such as starch and starch-derivatives like glucose syrup, maltodextrin and dextrin, the macromolecule begins with a reducing sugar, a free aldehyde. More hydrolysed starch contains more reducing sugars. The percentage of reducing sugars present in these starch derivatives (relative to dextrose) is called the "dextrose equivalent" (DE). In some exemplary embodiments, polymeric carbohydrates may (with or without hydrolysis) have a DE in the range of about 2 to about 70 for polymeric saccharides, and between about 70-100 for monomeric and oligomeric saccharides.

Other reducing monosaccharides may include glucose, fructose, glyceraldehyde and galactose. Many disaccharides, such as lactose and maltose, also have a reducing form, as one of the two units may have an open-chain form with an aldehyde group. Sugars having (full) acetal or ketal linkages are not reducing sugars, as they do not have free aldehyde chains. They therefore may not react with any of the reducing-sugar test solutions. Thus, sucrose and trehalose, in which the anomeric carbons of the two units are linked together forming an acetal, are non-reducing disaccharides since neither of the rings is capable of opening.

The present inventive concepts may include any isomeric and stereochemical forms of these saccharides. Furthermore, derivatives of saccharides may also be suitable, provided they retain their reducing nature after derivatization or can regain reducing capability under the rigorous heat conditions of asphalt processing. Thus, the saccharide may include O-glycosides, N-glycosides, O-alkyl (e.g. methyl, ethyl), O-acylated sugars, amino sugars, sugar alcohols (like sorbitol, xylitol, erythritol, etc.) and the like.

In some exemplary embodiments, the reducing carbohydrates have a molecular weight greater than about 100 Daltons. In this context, the term "molecular weight" is meant to denote a weight average molecular weight (in Daltons). In some exemplary embodiments, the reducing carbohydrates have a molecular weight from about 100 to about 1,000,000, from about 120 to about 100,000, and from about 120 to about 10,000.

A single type of reducing carbohydrate may be used alone in an odor mitigating amount; or it may be used in combination with other types of reducing carbohydrates in an odor mitigating composition or concentrate, the odor mitigating composition in total being used in an odor mitigating amount. Additionally, a single type of reducing carbohydrate or a combination of reducing carbohydrates in an odor mitigating amount may be used in combination with other odor-mitigating compounds such as, for example, the vanillin-type carbonyl compounds and/or terpene-type essential oil compounds known in the literature, or the soluble zinc compounds described herein.

While not intending to be limited to any particular theory of operation, it is believed that the reducing carbohydrates react with $H_2S$ and/or mercaptan (thiol) compounds having the general formula $R^3$—SH, and complex or sequester them, reducing their volatility. In some exemplary embodiments, the reaction may involve the formulation of hemithioacetals or thioacetals (when the carbohydrate has an aldehyde) or hemithioketals or thioketals (when the carbohydrate has a ketone. The following reaction scheme illustrates a proposed reaction mechanism, but this is not proven and not essential to the invention.

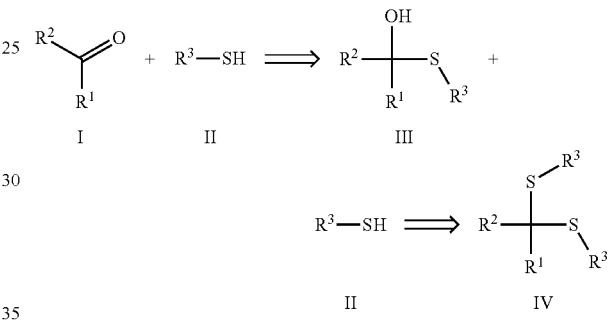

Structure I represents the reducing sugar, having an aldehyde functional group when $R^1$=H and a ketone functional group when $R^1$=a carbon chain. $R^2$ represents the remainder portion of the sugar, which may cyclize with $R^1$ to form the carbon chain of a ketone. Structure II represents malodorous mercaptans (thiols) where $R^3$ is an aliphatic or aromatic chain, or hydrogen sulfide if $R^3$=H. Structure III represents a hemi(thio)acetal or hemi(thio)ketal, depending if structure I is an aldehyde or a ketone, respectively. This reaction is analogous to the acetalation reaction with alcohols, except that thiols are more reactive than alcohols in this regard. In the presence of an excess of thiol compounds II, the reaction may proceed to structure IV, which is the full thioacetal or thioketal. Depending on the size and molecular weight of the sugar remainder $R^2$, and the mercaptan chains $R^3$, a fairly large structure III or IV may be created, thus reducing the volatility of such compounds.

Soluble Zinc Odor Mitigating Compounds

In some exemplary embodiments, the odor mitigating compounds include soluble zinc compounds. "Soluble" as used herein does not refer to water solubility; but rather solubility in hydrocarbonaceous materials like asphalts. ASTM procedure D2042-09 *Standard Test Method for Solubility of Asphalt Materials in Trichloroethylene* is a useful test for solubility of and in asphalts. As applied to roofing asphalts, the standard requires a minimum of 99% solubility, such that less than 1% (by weight) of content of the asphalt is captured by the filter paper; 99% or more is dissolved by the trichloroethylene. A comparable standard may be used to define solubility in hydrocarbonaceous materials; i.e. a compound is "soluble" as defined herein if at least 99% of added compound is dissolved in the trichloroethylene. Certain inorganic zinc compounds like zinc oxide, zinc sulfonate or zinc carbonate are not "soluble" as the term is used herein and are not within the odor mitigating soluble zinc compounds of the invention.

Illustrative soluble zinc compounds include, for example, the salts of a C8-C20 fatty acid, for example salts of lauric acid (zinc laurate), myristic acid (zinc myristate), myristoleic (zinc myristolate), palmitic acid (zinc palmitate), palmitoleic acid (zinc palmitolate), stearic acid (zinc stearate), oleic acid (zinc oleate), linoleic acid (zinc linolate), and linolenic acid (zinc linolenate). Other zinc salts include the salts of neodecanoic acid (zinc neodecanoate), 2,4-dimethyl-2-isopropylpentanoic acid, 2,5-dimethyl-2-ethylhexanoic acid, 2,2-dimethyloctanoic acid, and 2,2-diethylhexanoic acid and naphthenic acid, which is a mixture of cyclopentyl and cyclohexyl substituted carboxylic acids, and 2-ethylhexanoic acid.

In some exemplary embodiments, the soluble zinc compound is a salt of a C12-C18 acid. In some exemplary embodiments, the even-numbered fatty acids are more prevalent naturally and less expensive, so it may be advantageous to utilize salts of even numbered fatty acids in the C8-C20 range or the C12-C18, such as laurate, myristate, myristolate, palmitate, palmitolate, stearate, oleate, linolate, and linolenate.

Other illustrative zinc compounds may include salts of modified fatty acids having from about 4 to about 20 carbons, the modifications including (1) branching of the hydrocarbon chains, and (2) possessing substituents of hydroxyl, amino and carboxyl groups in the hydrocarbon chain, or (3) both (1) and (2). Notably, modified acids having amino substituents may include the natural or synthetic amino acids and modified fatty acids having carboxyl substituents include dicarboxylic acids that may form ionic polymers with divalent zinc. When such zinc salts of modified fatty acids are also "soluble", they are included within the invention.

In some exemplary embodiments, the odor mitigating soluble zinc compounds are added to the hydrocarbonaceous material in an odor mitigating amount to reduce the unpleasant or objectionable odors. In exemplary embodiments, the soluble zinc odor mitigating compounds may be added in small increments up to 5% (weight/volume or "w/v") of the hydrocarbonaceous material; e.g. from about 0.001% to about 5.0% w/v, or from 0.05% to about 1.0% w/v. In some exemplary embodiments, odor mitigating compounds are added in small increments up to 1% w/v.

Additional Odor Mitigating Compounds

In some exemplary embodiments, the odor mitigating compounds include aldehydes and ketones, such as, for example, those described in U.S. patent Publication 2009/0314184 to Quinn, et al., incorporated herein by reference. These compounds collectively are referred to herein as "carbonyl compounds" and have a molecular weight greater than about 100 Daltons and a boiling point greater than about 375° F., or greater than about 400° F. and, in some embodiments, at least about 450° F. Specific examples of such aldehyde-containing carbonyl compounds include 2-chlorobenzaldehyde, 4-chlorobenzaldehyde, alpha-methylcinnamaldehyde, 4-anisaldehyde, epsilon-cinnamaldehyde, vertraldehyde, 4-ethoxy-3-methoxybenzaldehyde, 3-ethoxy-4-hydroxybenzaldehyde, 3-nitrobenzaldehyde, vanillin, and cinnamaldehyde. In exemplary embodiments the composition consists solely of vanillin. Specific examples of such ketone-containing carbonyl compounds include, but are not limited to, camphor, isophorone, isobutyrophenone, propiophenone, 4-methylacetophenone, carvone, 4-chloroacetophenone, 2-benzoylbenzoic acid, 2'-acetonaphthone, benzophenone, fluorenone, 4'-ethoxyacetophenone, 4'-chlorobenzophenone, 4-acetylbenzonitrile, and 4'-hydroxyacetophenone.

These additional "carbonyl compounds" may be used in combination with reducing carbohydrate compounds and/or soluble zinc compounds described herein.

Process of Use

Odor mitigating concentrates and compositions useful in the invention can be made by routine methods using the odor mitigating compounds. Carrier vehicles may be used if desired and are described above.

The compounds or concentrates may be added to the hydrocarbonaceous material in various ways. In some exemplary embodiments, odor mitigating compounds or concentrates may be added to hydrocarbonaceous materials in hot-storage tanks. In other exemplary embodiments, the odor mitigating compounds or concentrates may be added to hydrocarbonaceous materials that are mixed with thermoplastic resins. In some exemplary embodiments, pellets of odor-reduced asphalt and resin are formed for dilution into other thermoplastics in molding operations. In this way the asphalt pellets are diluted as filler to extend the resins and provide it with unique properties as is known in the art. In still other exemplary embodiments, the odor mitigating compounds or concentrates may be added "on site" to kettles or drums of hot asphalt. For example, in built up roofing (BURA), asphalt is heated to about 350-450 F and many layers are formed as a composite roofing material. Paving asphalts are heated to about 250-350 F. The high temperature at which these products are typically used contributes to the volatility, as is known, although it also enhances the chemical reactions between the malodorous VOCs and the odor mitigating compounds, so as to enhance their elimination from volatile emissions.

EXAMPLES

The following examples serve to as illustrative embodiments and in no way limit the present invention.

Example 1

Preparation of Asphalt Samples

Three samples of asphalts were obtained from different sources and identified as Tanks, #9, #17 and #43. The respective composition of these samples is set forth in Table 1 below.

TABLE 1

Sample Asphalt Compositions

| | Tank #9 | Tank #17 | Tank #43 |
|---|---|---|---|
| Composition of Asphalt | 100% MAP Detroit Flux | 100% Exxon-Mobil Joliet PG 64-22, | Oxidized Roofing Coating: 45% Country Mark |

TABLE 1-continued

Sample Asphalt Compositions

|  | Tank #9 | Tank #17 | Tank #43 |
|---|---|---|---|
| Sample |  | lightly oxidized to Type I with Softening Point of 145-150 F. | 35.1% MooseJaw<br>10% Exxon-Mobil Joliet PG 64-22<br>4.5% Conoco Phillips PG 52-28<br>4.5% Conoco Phillips Flux<br>0.125% Phosphoric Acid |
| Initial Levels of: |  |  |  |
| $O_2$ (wt %) | 20.6 | 20.7 | 20.5 |
| LEL* (%) | 3 | 2 | 19 |
| $H_2S$ (ppm) | 37 | 82 | 104 |

*LEL refers to Lower Explosive Limit, as explained herein.

Example 2

Testing of Carbohydrate Odor Reducers in Asphalt Samples

Carbohydrate compounds (samples F, G and H) were tested for odor reduction in each of the three asphalt samples from Example 1. Controls included no additive (sample A), and two levels of vanillin additives as taught per US 2009/0314184 (samples B and C). The control and experimental sample compositions are set forth in Table 2, below. Note, omitted compositions D and E tested odor control zinc compounds as described in Example 3 below.

TABLE 2

Experimental odor reducing samples containing carbohydrates

|  | A | B | C | F | G | H |
|---|---|---|---|---|---|---|
| Asphalt composition from Tank, 9, 17 or 43 (g) | 300 | 300 | 300 | 300 | 300 | 300 |
| vanillin (g) | 0 | 0.1 | 0.1 | 0 | 0 | 0 |
| polypropylene pellets (g) | 0 | 0 | 3.6 | 0 | 0 | 0 |
| Glucose (anhydrous) (g) | 0 | 0 | 0 | 3 | 7.5 | 15 |

The 18 samples are thus designated by one of three tank numbers (#9, #17 or #43) and one of six composition letters (A-C, F-H). In the experiments, each of the 18 samples was mixed in a pint container until uniform, and was then stored in an oven at about 380 F (193 C) overnight. The samples were transferred to a quart container with a ¼ inch hole in the lid to allow for headspace gas analysis of hydrogen sulfide ($H_2S$), carbon monoxide (CO) and lowest explosive limit (LEL) gases using a Honeywell Lumidor MicroMax Plus monitor. Since CO is odorless, its values were not felt relevant and not recorded here. An initial reading was observed for t=0, and the containers were stored in the oven again at 380 F (193 C). The headspace gases were measured again at t=24 hours and t=10 days. The Lumidor was observed for peak measurements, and also at a consistent 2 minutes from opening each container. The Lumidor data, as well as some subjective observations are provided in Tables 3, 4 and 5, below, in which tr=trace, sl=slight, N/A=not available.

It should be noted that headspace gases provide a reasonable measure of the odors emanating from asphalt when volatile components in the sample liquid reach equilibrium with the headspace air. There are two instances where this equilibrium is potentially not reached: (1) on the initial reading, where equilibrium may not yet be reached; and (2) when a skin forms on the top of the liquid sample preventing the escape of volatile components. The data in the Tables below is interpreted in light of these caveats. For example, the 24 hour measure is a better initial comparison than t=0, and samples where a skin formed must be interpreted cautiously.

TABLE 3

Tank #9 Samples

|  | A | B | C | F | G | H |
|---|---|---|---|---|---|---|
| Initial $H_2S$ (ppm) | 2 | 4 | 3 | 2 | 2 | 4 |
| Initial LEL (%) | 0 | 0 | 0 | 1 | 2 | 1 |
| Initial Observations | sharp H2S | tr. H2S, vanillin | tr. H2S, vanillin | sl. burnt sugar | sl. burnt sugar, gas bubbles | sl. burnt sugar, gas bubbles |
| 24-hour $H_2S$ -peak (ppm) | 128 | 95 | 70 | 45 | 42 | 23 |
| 24-hour LEL -peak (%) | 6 | 6 | 6 | 6 | 6 | 5 |
| 24-hour $H_2S$ -2 min (ppm) | 61 | 27 | 33 | 25 | 22 | 12 |
| 24-hour LEL -2 min (%) | 4 | 4 | 4 | 4 | 4 | 4 |
| 24 hr Observations | sharp H2S | tr. H2S, vanillin | tr. H2S, vanillin | sl. burnt sugar | sl. burnt sugar, gas bubbles | sl. burnt sugar, gas bubbles |
| 10 day $H_2S$ -peak (ppm) | 513 | 275 | 333 | 235 | 182 | 220 |
| 10 day LEL -peak (%) | 6 | 4 | 5 | 5 | 4 | 4 |

TABLE 3-continued

Tank #9 Samples

|  | A | B | C | F | G | H |
|---|---|---|---|---|---|---|
| 10 day $H_2S$ -2 min (ppm) | 191 | 130 | 148 | 113 | 93 | 109 |
| 10 day LEL -2 min (%) | 4 | 3 | 4 | 4 | 3 | 3 |
| 10 d Observations | no skin, H2S odor | no vanillin odor | no vanillin odor, pellets at edge | no solids | tr. Solids | tr. Solids |

TABLE 4

Tank #17 Samples

|  | A | B | C | F | G | H |
|---|---|---|---|---|---|---|
| Initial $H_2S$ (ppm) | 43 | 44 | 41 | 22 | 10 | 4 |
| Initial LEL (%) | 2 | 2 | 2 | 2 | 1 | 1 |
| Initial Observations | strong odor | strong odor vanillin | strong odor vanillin | sl. burnt sugar; tr solids | sl. burnt sugar, gas bubbles, solids | sl. burnt sugar, gas bubbles, solids |
| 24-hour $H_2S$ -peak (ppm) | 29* | 42 | 35 | 50 | 25 | 30 |
| 24-hour LEL -peak (%) | 3* | 4 | 4 | 7 | 5 | 5 |
| 24-hour $H_2S$ -2 min (ppm) | 11* | 14 | 12 | 20 | 11 | 18 |
| 24-hour LEL -2 min (%) | 2* | 2 | 2 | 4 | 4 | 4 |
| 24 hr Observations (all samples have some skin over surface) | strong odor | strong odor vanillin | strong odor vanillin | sl. burnt sugar; tr solids | sl. burnt sugar, gas bubbles, solids | sl. burnt sugar, gas bubbles, solids |
| 10 day $H_2S$ -peak (ppm) | 3 | 24 | 5 | 18 | 17 | 17 |
| 10 day LEL -peak (%) | 1 | 1 | 0 | 1 | 1 | 1 |
| 10 day $H_2S$ -2 min (ppm) | 0 | 9 | 3 | 9 | 9 | 5 |
| 10 day LEL -2 min (%) | 0 | 0 | 0 | 0 | 0 | 0 |
| 10 d Observations (all skinned over) | no skin, H2S odor | non-vanillin, sour smell | non-vanillin, sour smell | | tr. Solids, burnt smell | tr. Solids, burnt smell |

*a pump problem caused some delay in testing sample A after opening the container

TABLE 5

Tank #43 Samples

|  | A | B | C | F | G | H |
|---|---|---|---|---|---|---|
| Initial $H_2S$ (ppm) | 4 | 4 | 2 | 2 | 1 | 1 |
| Initial LEL (%) | 0 | 0 | 0 | 0 | 0 | 0 |
| Initial Observations | sl. odor | sl. odor vanillin | sl. odor vanillin | sl. burnt sugar | sl. burnt sugar, solids | sl. burnt sugar, solids |
| 24-hour $H_2S$ -peak (ppm) | 9 | 7 | 10 | 4 | 5 | 122* |
| 24-hour LEL -peak (%) | 1 | 1 | 2 | 1 | 1 | 8* |
| 24-hour $H_2S$ -2 min (ppm) | 4 | 2 | 6 | 1 | 1 | 1* |
| 24-hour LEL -2 min (%) | 1 | 0 | 1 | 0 | 0 | 6* |
| 24 hr Observations (all samples viscous with skin) |  | vanillin | vanillin | sugar | sugar | sugar |
| 10 day $H_2S$ -peak (ppm) | 8 | 9 | 6 | 5 | 4 | 60* |
| 10 day LEL -peak (%) | 6 | 5 | 4 | 4 | 2 | 18* |
| 10 day $H_2S$ -2 min (ppm) | 4 | 5 | 4 | 2 | 2 | N/A* |
| 10 day LEL -2 min (%) | 3 | 2 | 2 | 2 | 1 | N/A* |
| 24 hr Observations (all samples viscous with skin) | | | | | | |

*absence of ¼ inch hole in this container lid during storage likely skewed these results; N/A due to high moisture flow clogging of pump It can be observed that the measures of offensive headspace gasses in samples containing carbohydrate compounds (F, G and H) were generally equivalent or lower than control samples at initial times and, while most samples worsened over time, the effect of this was typically less pronounced in samples F, G and H.

Example 3

Testing of Soluble Zinc Odor Reducers in Asphalt Samples

Soluble zinc compounds (samples D and E) were tested for odor reduction in each of the three asphalt samples from Example 1. Controls included no additive (sample A), and two levels of vanillin additives as taught per US 2009/0314184 (samples B and C). The control and experimental sample compositions are set forth in Table 6, below.

TABLE 6

Experimental odor reducing samples containing zinc compounds

|  | A | B | C | D | E |
|---|---|---|---|---|---|
| Asphalt composition from Tank, 9, 17 or 43 (g) | 300 | 300 | 300 | 300 | 300 |
| vanillin (g) | 0 | 0.1 | 0.1 | 0 | 0 |
| polypropylene pellets (g) | 0 | 0 | 3.6 | 0 | 0 |
| zinc stearate (g) | 0 | 0 | 0 | 1.5 | 6 |

The 15 samples are thus designated by one of three tank numbers (#9, #17 or #43) and one of five composition letters (A-E). In the experiments, each of the 15 samples was mixed in a pint container and tested using a Honeywell Lumidor MicroMax Plus monitor, as in Example 2. The Lumidor data, as well as some subjective observations are provided in Tables 7, 8 and 9, below, in which tr=trace, sl=slight, N/A=not available. The equilibrium caveats mentioned in Example 2 apply here as well.

TABLE 7

Tank #9 Samples

|  | A | B | C | D | E |
|---|---|---|---|---|---|
| Initial $H_2S$ (ppm) | 2 | 4 | 3 | 1 | 1 |
| Initial LEL (%) | 0 | 0 | 0 | 0 | 0 |
| Initial Observations | sharp H2S | tr. H2S, vanillin | tr. H2S, vanillin | mild oil odor | mild oil odor |
| 24-hour $H_2S$ -peak (ppm) | 128 | 95 | 70 | 3 | 1 |
| 24-hour LEL -peak (%) | 6 | 6 | 6 | 11 | 8 |
| 24-hour $H_2S$ -2 min (ppm) | 61 | 27 | 33 | 1 | 0 |
| 24-hour LEL -2 min (%) | 4 | 4 | 4 | 7 | 6 |
| 24 hr Observations | sharp H2S | tr. H2S, vanillin | tr. H2S, vanillin | mild oil odor | mild oil odor |
| 10 day $H_2S$ -peak (ppm) | 513 | 275 | 333 | 179 | 10 |
| 10 day LEL -peak (%) | 6 | 4 | 5 | 6 | 6 |
| 10 day $H_2S$ -2 min (ppm) | 191 | 130 | 148 | 87 | 9 |
| 10 day LEL -2 min (%) | 4 | 3 | 4 | 522 | 522 |
| 10 d Observations | no skin, H2S odor | no vanillin odor | no vanillin odor, pellets at edge | no odor | no odor |

TABLE 8

Tank #17 Samples

|  | A | B | C | D | E |
|---|---|---|---|---|---|
| Initial $H_2S$ (ppm) | 43 | 44 | 41 | 2 | 2 |
| Initial LEL (%) | 2 | 2 | 2 | 0 | 2 |
| Initial Observations | strong odor | strong odor vanillin | strong odor vanillin | mild odor | mild odor |
| 24-hour $H_2S$ -peak (ppm) | 29* | 42 | 35 | 7 | 2 |
| 24-hour LEL -peak (%) | 3* | 4 | 4 | 5 | 7 |
| 24-hour $H_2S$ -2 min (ppm) | 11* | 14 | 12 | 2 | 1 |
| 24-hour LEL -2 min (%) | 2* | 2 | 2 | 3 | 4 |
| 24 hr Observations (all samples have some skin over surface) | strong odor | strong odor vanillin | strong odor vanillin | mild odor | mild odor |
| 10 day $H_2S$ -peak (ppm) | 3 | 24 | 5 | 8 | 4 |
| 10 day LEL -peak (%) | 1 | 1 | 0 | 1 | 1 |

TABLE 8-continued

Tank #17 Samples

|  | A | B | C | D | E |
|---|---|---|---|---|---|
| 10 day $H_2S$ -2 min (ppm) | 0 | 9 | 3 | 4 | 1 |
| 10 day LEL -2 min (%) | 0 | 0 | 0 | 0 | 0 |
| 10 d Observations (all skinned over) | no skin, H2S odor | non-vanillin, sour smell | non-vanillin, sour smell |  |  |

*a pump problem caused some delay in testing sample A after opening the container

TABLE 9

Tank #43 Samples

|  | A | B | C | D | E |
|---|---|---|---|---|---|
| Initial $H_2S$ (ppm) | 4 | 4 | 2 | 2 | 1 |
| Initial LEL (%) | 0 | 0 | 0 | 0 | 0 |
| Initial Observations | sl. odor | sl. odor vanillin | sl. odor vanillin | tr odor | tr odor |
| 24-hour $H_2S$ -peak, (ppm) | 9 | 7 | 10 | 5 | 4 |
| 24-hour LEL -peak (%) | 1 | 1 | 2 | 2 | 1 |
| 24-hour $H_2S$ -2 min (ppm) | 4 | 2 | 6 | 4 | 0 |
| 24-hour LEL -2 min (%) | 1 | 0 | 1 | 1 | 1 |
| 24 hr Observations (all samples viscous with skin) |  | vanillin | vanillin |  |  |
| 10 day $H_2S$ -peak (ppm) | 8 | 9 | 6 | 2 | 2 |
| 10 day LEL -peak (%) | 6 | 5 | 4 | 3 | 6 |
| 10 day $H_2S$ -2 min (ppm) | 4 | 5 | 4 | 1 | 1 |
| 10 day LEL -2 min (%) | 3 | 2 | 2 | 2 | 4 |
| 24 hr Observations (all samples viscous with skin) |  |  |  |  |  |

It can be observed that the measures of offensive headspace gasses (especially $H_2S$) in samples containing soluble zinc compounds (D and E) were initially lower than control samples and, while most samples worsened over time, the effect of this was typically less pronounced in samples D and E.

The foregoing description of the various aspects and embodiments of the present invention has been presented for purposes of illustration and description. It is not intended to be exhaustive or all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

What is claimed is:

1. A composition having reduced foul odors, comprising: at least 95 weight % of a hydrocarbonaceous material; and an odor mitigating concentrate containing an odor mitigating compound and a carrier vehicle, said odor mitigating compound being present in said composition in an amount of about 0.001 weight % to 1.0 weight % and said carrier vehicle being one of vegetable oil, mineral oil, fatty acid alkyl esters, ethoxylates, and polyether,
wherein the foul odors are reduced by 20% to 95% relative to the hydrocarbonaceous material in the absence of the odor mitigating concentrate; and
wherein said odor mitigating compound comprises at least one reducing carbohydrate and a carbonyl compound having a molecular weight greater than about 100 Daltons and a boiling point greater than about 375° F.

2. A composition having reduced foul odors, comprising:
at least 95 weight % of a hydrocarbonaceous material; and
an odor mitigating concentrate containing an odor mitigating compound and a carrier vehicle, said odor mitigating compound being present in said composition in an amount of about 0.001 weight % to 1.0 weight % and said carrier vehicle being one of vegetable oil, mineral oil, fatty acid alkyl esters, ethoxylates, and polyether,
wherein the foul odors are reduced by 20% to 95% relative to the hydrocarbonaceous material in the absence of the odor mitigating concentrate; and
wherein said odor mitigating compound comprises at least one reducing carbohydrate that is a monosaccharide.

3. A composition having reduced foul odors, comprising:
at least 95 weight % of a hydrocarbonaceous material; and
an odor mitigating concentrate containing an odor mitigating compound and a carrier vehicle, said odor mitigating compound being present in said composition in an amount of about 0.001 weight % to 1.0 weight % and said carrier vehicle being one of vegetable oil, mineral oil, fatty acid alkyl esters, ethoxylates, and polyether,
wherein the foul odors are reduced by 20% to 95% relative to the hydrocarbonaceous material in the absence of the odor mitigating concentrate; and
wherein said odor mitigating compound comprises at least one reducing carbohydrate that is a polysaccharide having a dextrose equivalent of 2 to 70.

4. A composition having reduced foul odors, comprising:
at least 95 weight % of a hydrocarbonaceous material; and
an odor mitigating concentrate containing an odor mitigating compound and a carrier vehicle, said odor mitigating compound being present in said composition in an amount of about 0.001 weight % to 1.0 weight % and said carrier vehicle being one of vegetable oil, mineral oil, fatty acid alkyl esters, ethoxylates, and polyether,
wherein the foul odors are reduced by 20% to 95% relative to the hydrocarbonaceous material in the absence of the odor mitigating concentrate; and
wherein said odor mitigating compound comprises at least one reducing carbohydrate that is an oligosaccharide.

5. A composition having reduced foul odors, comprising:
at least 95 weight % of an asphalt; and
an odor mitigating concentrate containing an odor mitigating compound and a carrier vehicle, said odor litigating compound being present in said composition in an amount of about 0.001 weight % to 1.0 weight % and said carrier vehicle being one of vegetable oil, mineral oil, fatty acid alkyl esters, ethoxylates, and polyether,
wherein the foul odors are reduced by 20% to 95% relative to the hydrocarbonaceous material in the absence of the odor mitigating concentrate; and
wherein said odor mitigating compound comprise at least one reducing carbohydrate.

6. The composition of claim 5, wherein the odor mitiagting compound further comprises at least one soluble zinc compound.

7. The composition of claim 6, wherein the soluble zinc compound is salt of a C8-C20 fatty acid.

8. The material composition of claim 7, wherein the soluble zinc compound is selected from salts of lauric acid, myristic acid, myristoleic, palmitic acid, palmitoleic acid, stearic acid, oleic acid, linoleic acid, linolenic acid, and combinations thereof.

9. The composition of claim 6, wherein the soluble zinc compound is a salt of a C12-C18 fatty acid.

10. The composition of claim 5, wherein the odor mitigating compound has a molecular weight of less than 10,000 daltons.

11. A composition having reduced foul odors, comprising:
at least 95 weight % of an asphalt; and
an odor mitigating concentrate containing an odor mitigating compound and a carrier vehicle, said odor mitigating compound being present in said composition in an amount of 0.001 weight % to 1.0 weight % and said carrier vehicle being one of vegetable oil, mineral oil, fatty acid alkyl esters, ethoxylates, and polyether;
wherein the foul odors are reduced by 20% to 95% relative to the asphalt in the absence of the odor mitigating concentrate; and
wherein the odor mitigating compound comprises a soluble zinc compound.

12. The composition of claim 11, wherein the soluble zinc compound is a salt of a C8-C20 fatty acid.

13. The composition of claim 11, wherein the soluble zinc compound is a salt of a C12-C18 fatty acid.

14. The composition of claim 11, wherein the soluble zinc compound is selected from salts of lauric acid, myristic acid, myristoleic, palmitic acid, palmitoleic acid, stearic acid, oleic acid, linoleic acid, linolenic acid, and combinations thereof.

15. The composition of claim 11, wherein the odor mitigating concentrate further comprises at least one additional odor mitigating compound.

16. The composition of claim 15, wherein the at least one additional odor mitigating compound comprises a carbonyl compound having a molecular weight greater than about 100 daltons and a boiling point greater than about 375° F.

17. The composition of claim 15, wherein the at least one additional odor mitigating compound comprises a reducing carbohydrate.

18. The composition of claim 17, wherein the reducing carbohydrate comprises a monosaccharide.

19. The composition of claim 17, wherein the reducing carbohydrate comprises a polysaccharide having a dextrose equivalent of 2 to 70.

20. The composition of claim 17, wherein the reducing carbohydrate comprises an oligosaccharide.

\* \* \* \* \*